(12) United States Patent
Cowley

(10) Patent No.: US 11,731,475 B2
(45) Date of Patent: Aug. 22, 2023

(54) AGENT INJECTION SYSTEM, AN AIRBAG APPARATUS, A PROCESS OF FILLING A SUSPENSION AIRBAG, A PROCESS OF REPAIRING A SUSPENSION AIRBAG, AND METHODS OF USE

(71) Applicant: Denis Cowley, Amarillo, TX (US)

(72) Inventor: Denis Cowley, Amarillo, TX (US)

( * ) Notice: Subject to any disclaimer, the term of this patent is extended or adjusted under 35 U.S.C. 154(b) by 0 days.

(21) Appl. No.: 17/699,262

(22) Filed: Mar. 21, 2022

(65) Prior Publication Data
US 2022/0305861 A1 Sep. 29, 2022

Related U.S. Application Data

(60) Provisional application No. 63/164,757, filed on Mar. 23, 2021.

(51) Int. Cl.
*B60G 11/26* (2006.01)
*B62D 65/02* (2006.01)

(52) U.S. Cl.
CPC ............ *B60G 11/26* (2013.01); *B62D 65/026* (2013.01); *B60G 2300/04* (2013.01)

(58) Field of Classification Search
CPC ................ B60G 11/26; B60G 2300/04; B60G 2206/90; B62D 65/026; B50G 11/27; F16F 9/3271; F16F 9/04
See application file for complete search history.

(56) References Cited

U.S. PATENT DOCUMENTS

| | | | | |
|---|---|---|---|---|
| 6,244,608 B1 * | 6/2001 | Hess | .................... | B62D 53/068 280/149.2 |
| 8,888,129 B2 * | 11/2014 | Arzanpour | .............. | B60R 21/02 296/187.05 |
| 2007/0141253 A1 * | 6/2007 | Chan | ......................... | F16F 9/04 427/140 |
| 2015/0217620 A1 * | 8/2015 | Berg | ................... | B60G 17/0432 280/6.157 |
| 2015/0316039 A1 * | 11/2015 | Tucker | .................... | F01C 1/103 280/5.5 |
| 2021/0239177 A1 * | 8/2021 | Siodmok | ................... | F16F 9/43 |

FOREIGN PATENT DOCUMENTS

| | | | | |
|---|---|---|---|---|
| CN | 102874204 A | * | 1/2013 | .......... B60R 21/237 |
| DE | 10319670 A1 | * | 12/2004 | ................ F16F 9/04 |
| KR | 101986772 B1 | * | 6/2019 | |
| WO | WO-2017145116 A1 | * | 8/2017 | ......... B60N 2/42736 |

OTHER PUBLICATIONS

Machine Translation of DE10319670 (Year: 2004).*

* cited by examiner

*Primary Examiner* — Drew J Brown

(57) ABSTRACT

A moveable subframe system, a slider box improvement system, an agent injection system, an airbag apparatus, a process of filling a suspension airbag, a process of repairing a suspension airbag, and methods of use are presented. The present disclosure provides an apparatus, process, manufacturing method, and methods of use for an airbag and/or airbag replacement for an air ride suspension system. The disclosure may include replacement and/or new installation of a no-flat airbag to be used in an air suspension system, thus reducing waste and costs associated with suspension system repair. Utilizing the system and process disclosed herein, a broken and/or punctured airbag of an existing airbag suspension system is repaired and utilized in operation. Furthermore, the system provides for utilizing new airbags in the same.

10 Claims, 12 Drawing Sheets

AGENT INJECTION SYSTEM, AN AIRBAG APPARATUS, A PROCESS OF FILLING A SUSPENSION AIRBAG, A PROCESS OF REPAIRING A SUSPENSION AIRBAG, AND METHODS OF USE

CROSS-REFERENCE TO RELATED APPLICATIONS

The present application claims priority to the U.S. Provisional Patent Application No. 63/164,757 which was filed on Mar. 23, 2021, which is hereby incorporated by reference herein in its entirety, including any figures, tables, or drawings.

FIELD OF THE DISCLOSURE

The present disclosure relates generally to an agent injection system, an airbag apparatus, a process of filling a suspension airbag, a process of repairing a suspension airbag, and methods of use. More specifically, and without limitation, the present disclosure is a device which relates generally to subframes for heavy-duty vehicles, such as tractor trailers. More specifically, and without limitation, the present disclosure is directed to a suspension improvement for a moveable subframe for tractor-trailers. More specifically, and without limitation, the present disclosure relates to an apparatus, process of making, and method of use for a non-flat airbag suspension system. However, the present disclosure is not limited to these novel and inventive improvements, and it may further be adapted for a variety of purposes.

COPYRIGHT NOTICE

At least a portion of the disclosure of this patent document contains material that is subject to copyright protection. The copyright owner has no objection to the facsimile reproduction by anyone of the patent document or the patent disclosure, as it appears in the Patent and Trademark Office patent files and/or records, but otherwise reserves all copyright rights whatsoever. The following notice applies to the software and data as described below and in the drawings that form a part of this document: Copyright Denis Cowley. All rights reserved.

BACKGROUND OF THE DISCLOSURE

Suspension systems are well known in the art. Suspension systems, generally speaking, provide for smooth riding and/or smooth operation of a vehicle. In tractor/trailer applications, suspension systems are commonly air ride suspension systems. Tractor trailer operations commonly carry heavy loads and the air ride suspension systems used today provide for protecting the cargo as well as making a ride comfortable for an operator.

Air ride suspension systems utilize a high pressure air bag. This high pressure air bag works in concert with suspension systems in order to provide a cushion effect for the tractor and/or trailer and/or vehicle in which the airbag suspension system is used. These airbags can be found in the tractor suspension system as well as in the trailer suspension system and often are utilized with slider boxes, and/or suspension systems and/or subframes.

Air ride suspension systems utilize air bags. These air bags can go flat or require occasional replacement and/or repair. Replacing and/or repairing these air bags is a laborious task. Furthermore, due to the nature of the system, airbags must be replaced, creating a great deal of waste. Furthermore, air bags often have to be replaced overnight, causing further strain and hours of labor, even for a single airbag replacement, so that a tractor trailer can safely operate; this is due to the nature of the industries in which airbag suspension systems are utilized, in accordance with operations. For environmental friendliness, and safety reasons, among other reasons, a more effective airbag system, replacement means, and operating means is needed in the art. As mentioned, airbags are utilized with subframe systems and slider boxes.

Slider boxes are well known in the art, especially in tractor-trailer applications. Movable subframes, another term for slider boxes, are used in heavy-duty vehicle applications. In other words, and as most commonly found, subframes, such as slider boxes, can often be applied to tractor trailers and/or semi trucks. In this application, one or more axle and/or suspension systems usually are suspended from a single slider box and typically located at the rear of the tractor trailer.

A subframe is a structural component of a vehicle. A subframe can commonly be found in cars, semi trucks, semi truck trailers, airplanes, and other craft used in transportation and the like. Typically subframes are hidden and/or are a separate structure which forms the structural elements of a vehicle or the like on a frame and/or body. The subframe is generally bolted and/or welded to the other components of the vehicle such as the drivetrain, body, and/or other mechanics serving the vehicle purpose.

The purpose of a subframe in a vehicle is to distribute the load of the vehicle created by the mechanics, drivetrain, and/or other loads such as a semi-truck trailer load. A trailer load will often involve thousands of pounds of weight. In some cases 40,000 pounds or more can be loaded in a trailer. The purpose of the subframe in these circumstances is to enable distribution of the heavy loads.

Subframes are typically made of structural steel bolted and/or welded together which carries the load. However, various subframe assemblies and types can be found in the art. Subframes often include additional components such as axles, suspensions, suspension features, additional framing components, engines, transmissions, and more.

Semi-trailers are well known in the art. Semi-trailer is a term used, often to refer to, a trailer which has at least one axle and wheels in the back, but that is also carried by a semi or tractor in the front. Semi-trailers and/or tractor-trailers are used regularly in commerce and the like to move goods around the globe. Semi-trailers are used to move goods from dry goods to liquid goods and generally require loading at one end and then unloading at another end of a journey. Loading, traveling, and unloading a tractor-trailer often requires adjustment in the way a load is distributed. This adjustment is commonly carried out by manipulating the subframe and thus manipulating the weight distribution over the wheels of the tractor-trailer. This manipulation makes loading and/or unloading easier while also making travel safer and making roads last longer. For these reasons, an effective airbags system for many hours of operation, regularly and comfort for a rider are enhanced in importance.

In order to accomplish safe and more effective airbag replacement and/or reduce replacement requirements, the following disclosures provide systems, processes of replacement and the like which cause airbags to be easier to replace, more affordable, last longer, require less maintenance and more.

These systems, similarly, are used for manipulation of loads for semi-trailers during loading, traversing, and unloading and the like, semi-trailers commonly employ slider boxes. Slider boxes are a type of sub frame system that can redistribute how a load is carried and/or change the distribution of weight for a semi-trailer. A slider box is also commonly known in the art. A slider box generally has two axles and/or suspension systems. For this reason, in many general applications, the slider box might also be referred to as a tandem. Slider boxes may also be outfitted with other numbers of axles, however two is one of the more common numbers found in the art.

Slider boxes are found on the underside of a trailer frame. Generally speaking a trailer is moved forward or backward along a slider box in order to distribute or redistribute load during or after loading of the trailer. More specifically, a slider box will often need to be adjusted depending on the local, state, or national road laws. So the slider box adjustment may be made multiple times before, during, or after weight checks on a scale. Adjusting the weight not only helps comply with laws, but also helps with load distribution for efficiency and vehicle maneuvering.

Slider boxes can be nearly impossible to adjust. In fact, some others in the art have developed machines to help operators adjust "pin" settings so that machines can control the adjustment of slider boxes. Slider boxes are especially difficult to adjust and often impossible to adjust when a trailer is loaded and/or fully loaded with weight. In some cases, weight has to be removed from trailers so adjustments can be made. In these events, delay, monetary value, and other factors can cause great loss. Complicating matters further, slider boxes can be dangerous when they are difficult to operate. This can result in injury to the operator either because of the strain it takes to operate the slider box or due to slider box operation.

Thus, the present disclosure provides the state of the art with a moveable subframe system, a slider box improvement system, an agent injection system, an airbag apparatus, a process of filling a suspension airbag, a process of repairing a suspension airbag, and methods of use. These systems, processes, and methods of use provide the state of the art with a more effective airbag, that requires less maintenance, provides cost savings, reduces replacement occurrences, improves environmentally friendliness and more. These and other solutions and disclosures are provided herein.

SUMMARY OF THE DISCLOSURE

The present disclosure relates generally to a moveable subframe system, a slider box improvement system, an agent injection system, an airbag apparatus, a process of filling a suspension airbag, a process of repairing a suspension airbag, and methods of use. More specifically, and without limitation, the present disclosure is a device which relates generally to subframes for heavy-duty vehicles, such as tractor trailers. More specifically, and without limitation, the present disclosure is directed to a suspension improvement for a moveable subframe for tractor-trailers. More specifically, and without limitation, the present disclosure relates to an apparatus, process of making, and method of use for a non-flat airbag suspension system. However, the present disclosure is not limited to these novel and inventive improvements, and it may further be adapted for a variety of purposes.

Said another way, the present disclosure provides an airbag suspension system, process, and method of use that enables effective operation of airbag suspension systems while requiring less maintenance, reducing waste, saving costs, and more. Furthermore, the present disclosure provides both a new airbag apparatus to replace existing airbags as well as a means and process for repairing existing airbags.

However, the present disclosure is not limited to these novel and inventive improvements, and it may further be adapted for a variety of purposes.

Thus, it is a primary object of the disclosure to provide a moveable subframe system, a slider box improvement system, an agent injection system, an airbag apparatus, a process of filling a suspension airbag, a process of repairing a suspension airbag, and methods of use that improve upon the state of the art.

Another object of the disclosure is to provide a moveable subframe system, a slider box improvement system, an agent injection system, an airbag apparatus, a process of filling a suspension airbag, a process of repairing a suspension airbag, and methods of use that are environmentally friendly.

Yet another object of the disclosure is to provide a moveable subframe system, a slider box improvement system, an agent injection system, an airbag apparatus, a process of filling a suspension airbag, a process of repairing a suspension airbag, and methods of use that reduces airbag waste.

Another object of the disclosure is to provide a moveable subframe system, a slider box improvement system, an agent injection system, an airbag apparatus, a process of filling a suspension airbag, a process of repairing a suspension airbag, and methods of use that reduces airbag replacement occurrences.

Yet another object of the disclosure is to provide a moveable subframe system, a slider box improvement system, an agent injection system, an airbag apparatus, a process of filling a suspension airbag, a process of repairing a suspension airbag, and methods of use that provides for more effective airbag repair.

Another object of the disclosure is to provide a moveable subframe system, a slider box improvement system, an agent injection system, an airbag apparatus, a process of filling a suspension airbag, a process of repairing a suspension airbag, and methods of use that provides an airbag without air which is as effective as airbags with air.

Yet another object of the disclosure is to provide a moveable subframe system, a slider box improvement system, an agent injection system, an airbag apparatus, a process of filling a suspension airbag, a process of repairing a suspension airbag, and methods of use that are safe to use.

Another object of the disclosure is to provide a moveable subframe system, a slider box improvement system, an agent injection system, an airbag apparatus, a process of filling a suspension airbag, a process of repairing a suspension airbag, and methods of use that are easy to use.

Yet another object of the disclosure is to provide a moveable subframe system, a slider box improvement system, an agent injection system, an airbag apparatus, a process of filling a suspension airbag, a process of repairing a suspension airbag, and methods of use that are robust.

Yet another object of the disclosure is to provide a moveable subframe system, a slider box improvement system, an agent injection system, an airbag apparatus, a process of filling a suspension airbag, a process of repairing a suspension airbag, and methods of use that are easy to set up.

Another object of the disclosure is to provide a moveable subframe system, a slider box improvement system, an agent injection system, an airbag apparatus, a process of filling a suspension airbag, a process of repairing a suspension airbag, and methods of use that are relatively affordable to implement.

Yet another object of the disclosure is to provide a moveable subframe system, a slider box improvement system, an agent injection system, an airbag apparatus, a process of filling a suspension airbag, a process of repairing a suspension airbag, and methods of use that can be retro-fit into existing systems.

Another object of the disclosure is to provide a moveable subframe system, a slider box improvement system, an agent injection system, an airbag apparatus, a process of filling a suspension airbag, a process of repairing a suspension airbag, and methods of use that provides for a means to fill airbags quickly and to a similar pressure as in common use for various applications.

Yet another object of the disclosure is to provide a moveable subframe system, a slider box improvement system, an agent injection system, an airbag apparatus, a process of filling a suspension airbag, a process of repairing a suspension airbag, and methods of use that can be used repeatedly.

Another object of the disclosure is to provide a moveable subframe system, a slider box improvement system, an agent injection system, an airbag apparatus, a process of filling a suspension airbag, a process of repairing a suspension airbag, and methods of use that are lightweight.

Yet another object of the disclosure is to provide a moveable subframe system, a slider box improvement system, an agent injection system, an airbag apparatus, a process of filling a suspension airbag, a process of repairing a suspension airbag, and methods of use that improve upon airbag suspension systems.

Another object of the disclosure is to provide a moveable subframe system, a slider box improvement system, an agent injection system, an airbag apparatus, a process of filling a suspension airbag, a process of repairing a suspension airbag, and methods of use that provide a slider box with enhanced suspension systems.

Yet another object of the disclosure is to provide a moveable subframe system, a slider box improvement system, an agent injection system, an airbag apparatus, a process of filling a suspension airbag, a process of repairing a suspension airbag, and methods of use that increase the strength of an airbag.

Another object of the disclosure is to provide a moveable subframe system, a slider box improvement system, an agent injection system, an airbag apparatus, a process of filling a suspension airbag, a process of repairing a suspension airbag, and methods of use that increases convenience for a user or repair operator.

Yet another object of the disclosure is to provide a moveable subframe system, a slider box improvement system, an agent injection system, an airbag apparatus, a process of filling a suspension airbag, a process of repairing a suspension airbag, and methods of use that work under various operating conditions and/or various pressure conditions.

Another object of the disclosure is to provide a moveable subframe system, a slider box improvement system, an agent injection system, an airbag apparatus, a process of filling a suspension airbag, a process of repairing a suspension airbag, and methods of use that make airbag adjustments smooth and easy.

Yet another object of the disclosure is to provide a moveable subframe system, a slider box improvement system, an agent injection system, an airbag apparatus, a process of filling a suspension airbag, a process of repairing a suspension airbag, and methods of use that may utilize high strength materials.

Another object of the disclosure is to provide a moveable subframe system, a slider box improvement system, an agent injection system, an airbag apparatus, a process of filling a suspension airbag, a process of repairing a suspension airbag, and methods of use that work with an automated system.

Another object of the disclosure is to provide a moveable subframe system, a slider box improvement system, an agent injection system, an airbag apparatus, a process of filling a suspension airbag, a process of repairing a suspension airbag, and methods of use that work with a slider box system or fixed suspension system.

Yet another object of the disclosure is to provide a moveable subframe system, a slider box improvement system, an agent injection system, an airbag apparatus, a process of filling a suspension airbag, a process of repairing a suspension airbag, and methods of use that can be implemented in various ways to accommodate various applications.

These and other objects, features, or advantages of the present disclosure will become apparent from the specification and claims.

DETAILED DESCRIPTION OF THE DISCLOSURE

Figure 1:
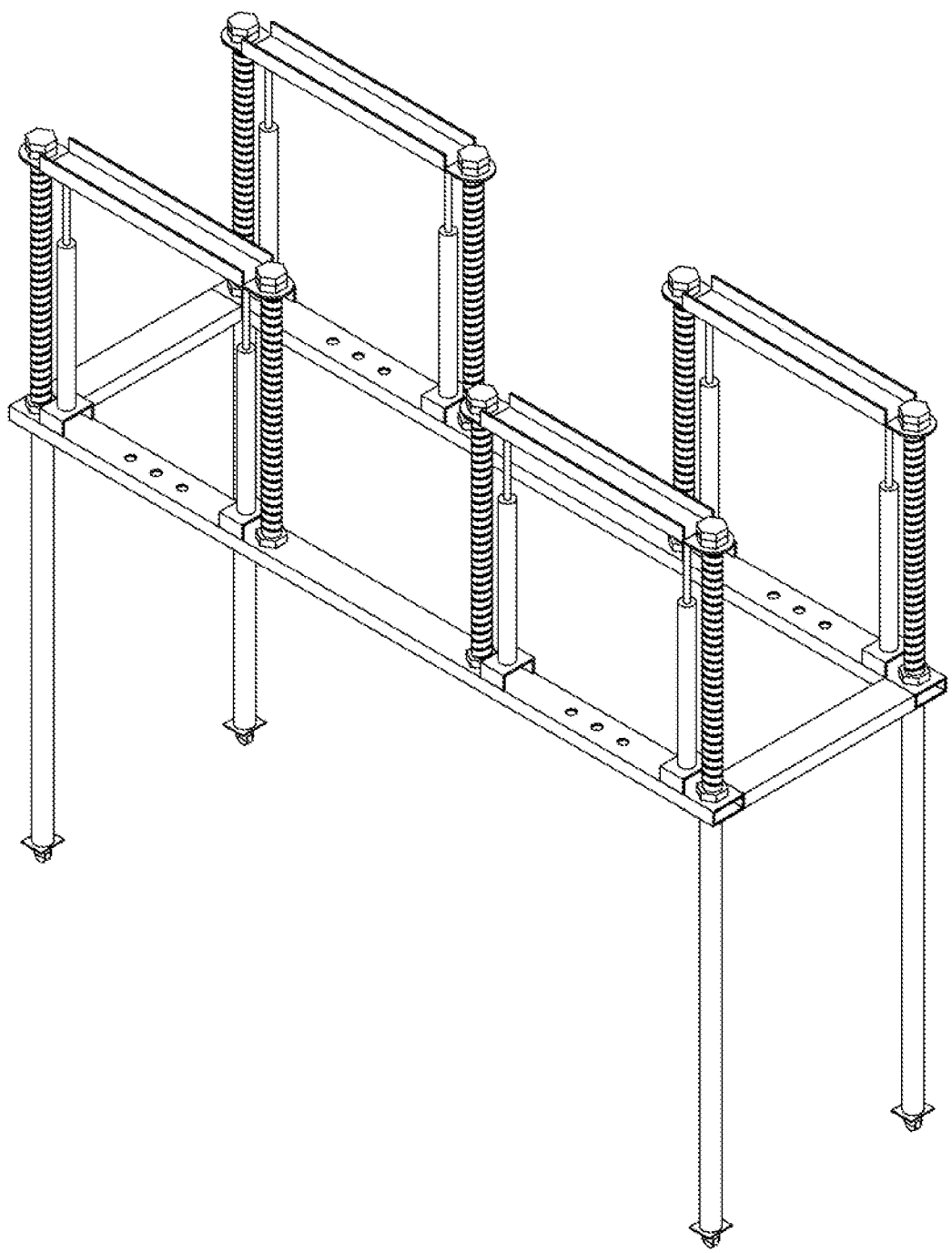
FIG. 1 is a top, perspective view of an agent injection system, an airbag apparatus, a process of filling a suspension airbag, a process of repairing a suspension airbag, and methods of use; the view showing an airbag jig system; the view showing a plurality of supports; the view showing a plurality of attachment features; the view showing a plurality of adjustment features; the view showing a plurality of features for holding the airbags in place; the view showing mobility features.
Figure 2:
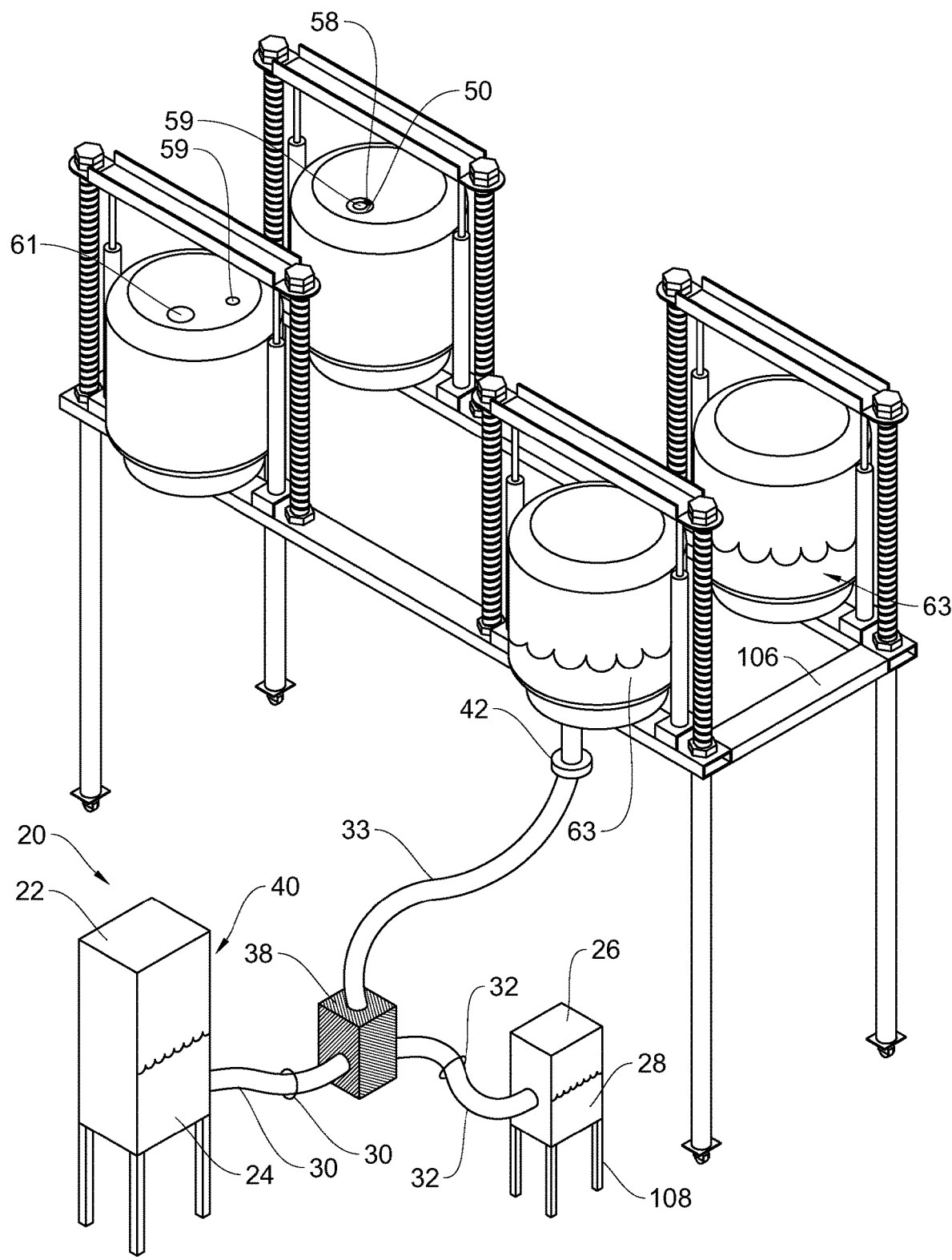
FIG. 2 is a top, perspective view of an agent injection system, an airbag apparatus, a process of filling a suspension airbag, a process of repairing a suspension airbag, and methods of use; the view showing an airbag jig system; the view showing a plurality of supports; the view showing a plurality of attachment features; the view showing a plurality of adjustment features; the view showing a plurality of features for holding the airbags in place; the view showing mobility features; the view showing a plurality of airbags located in the airbag jig system and ready for filling and/or filled.
Figure 3:
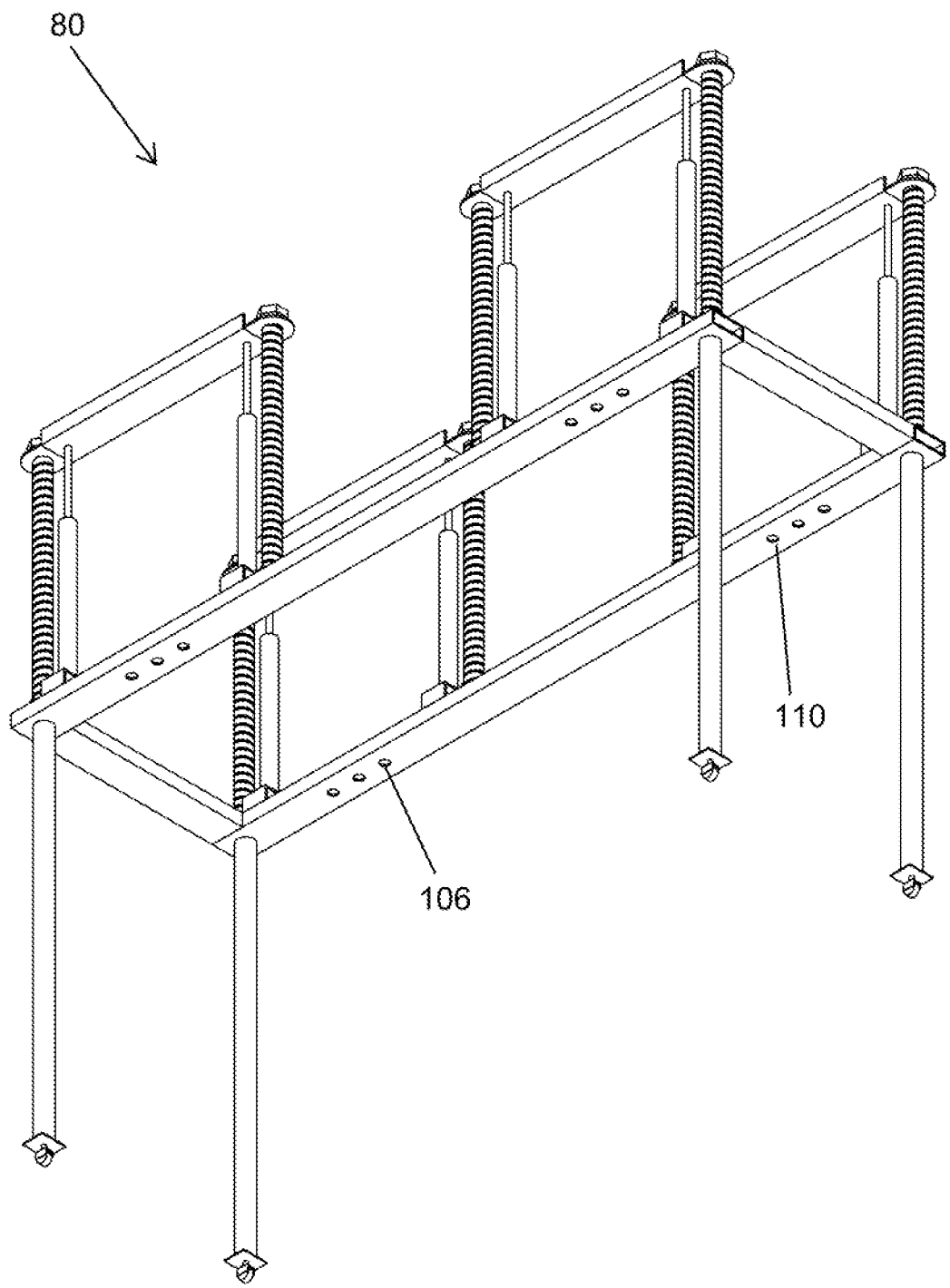
FIG. 3 is a bottom, perspective view of an agent injection system, an airbag apparatus, a process of filling a suspension airbag, a process of repairing a suspension airbag, and methods of use; the view showing an airbag jig system; the view showing a plurality of supports; the view showing a plurality of attachment features; the view showing a plurality of adjustment features; the view showing a plurality of features for holding the airbags in place; the view showing mobility features.
Figure 4:
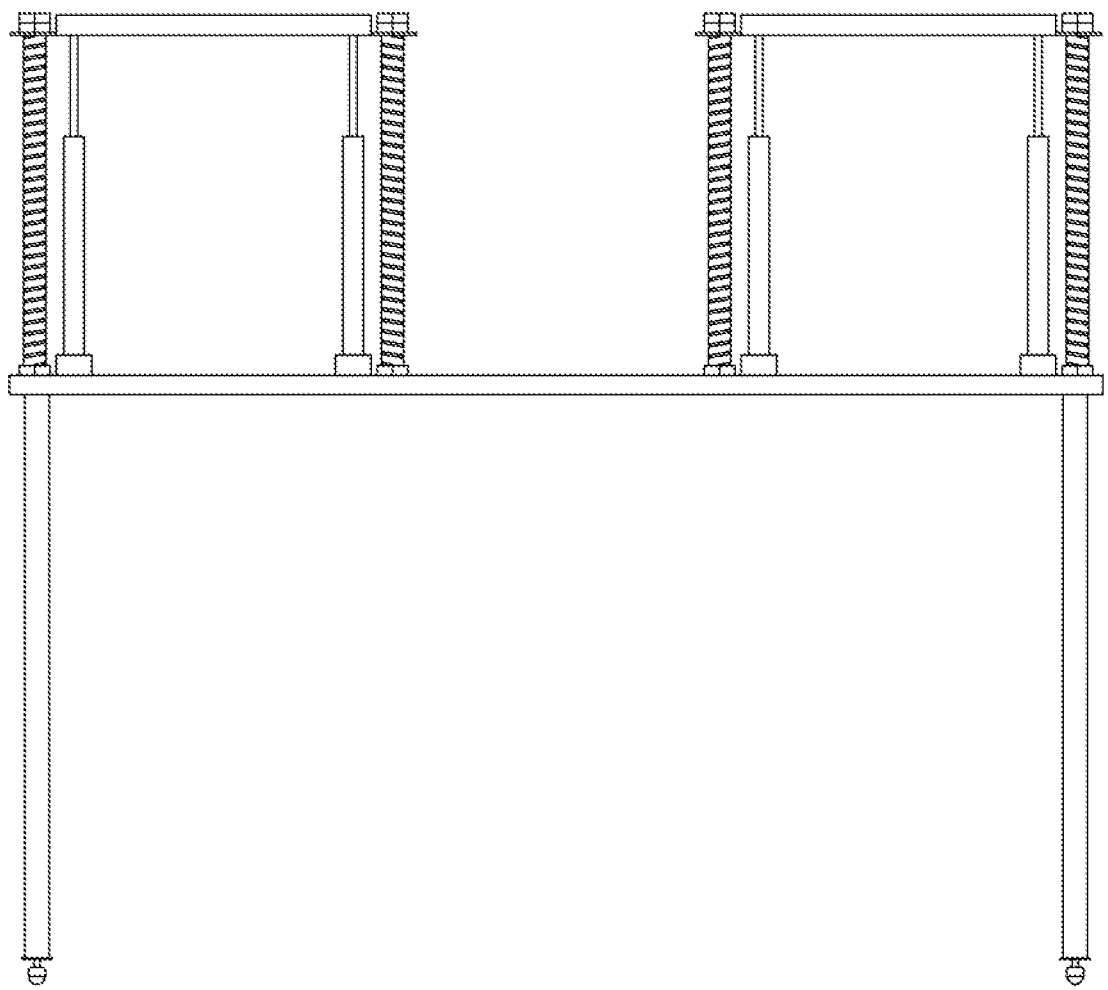
FIG. 4 is a front, elevation view of an agent injection system, an airbag apparatus, a process of filling a suspension airbag, a process of repairing a suspension airbag, and methods of use; the view showing an airbag jig system; the view showing a plurality of supports; the view showing a plurality of attachment features; the view showing a plurality of adjustment features; the view showing a plurality of features for holding the airbags in place; the view showing mobility features.
Figure 5:
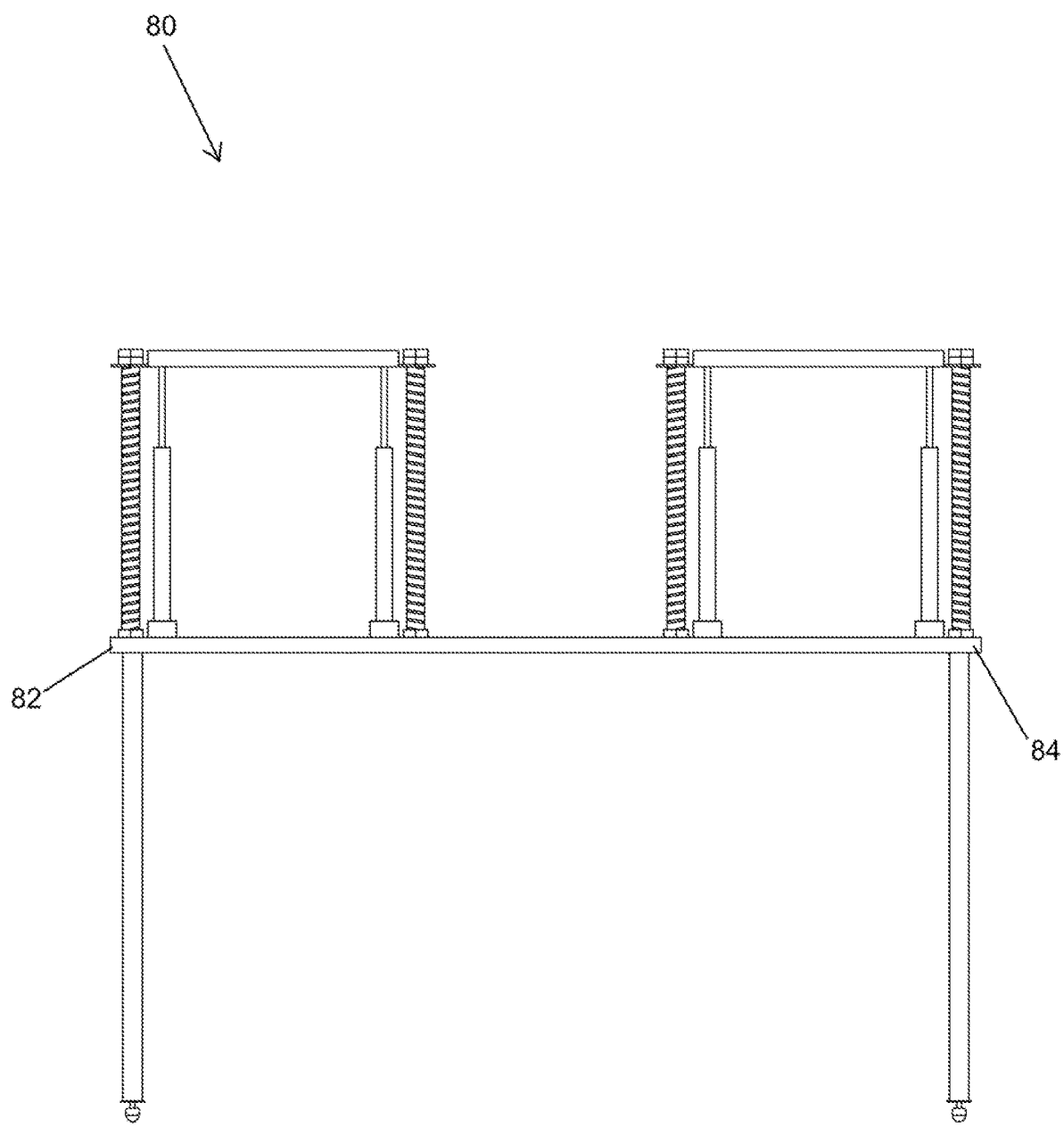
FIG. 5 is a rear, elevation view of an agent injection system, an airbag apparatus, a process of filling a suspension airbag, a process of repairing a suspension airbag, and methods of use; the view showing an airbag jig system; the view showing a plurality of supports; the view showing a plurality of attachment features; the view showing a plurality of adjustment features; the view showing a plurality of features for holding the airbags in place; the view showing mobility features.
Figure 6:
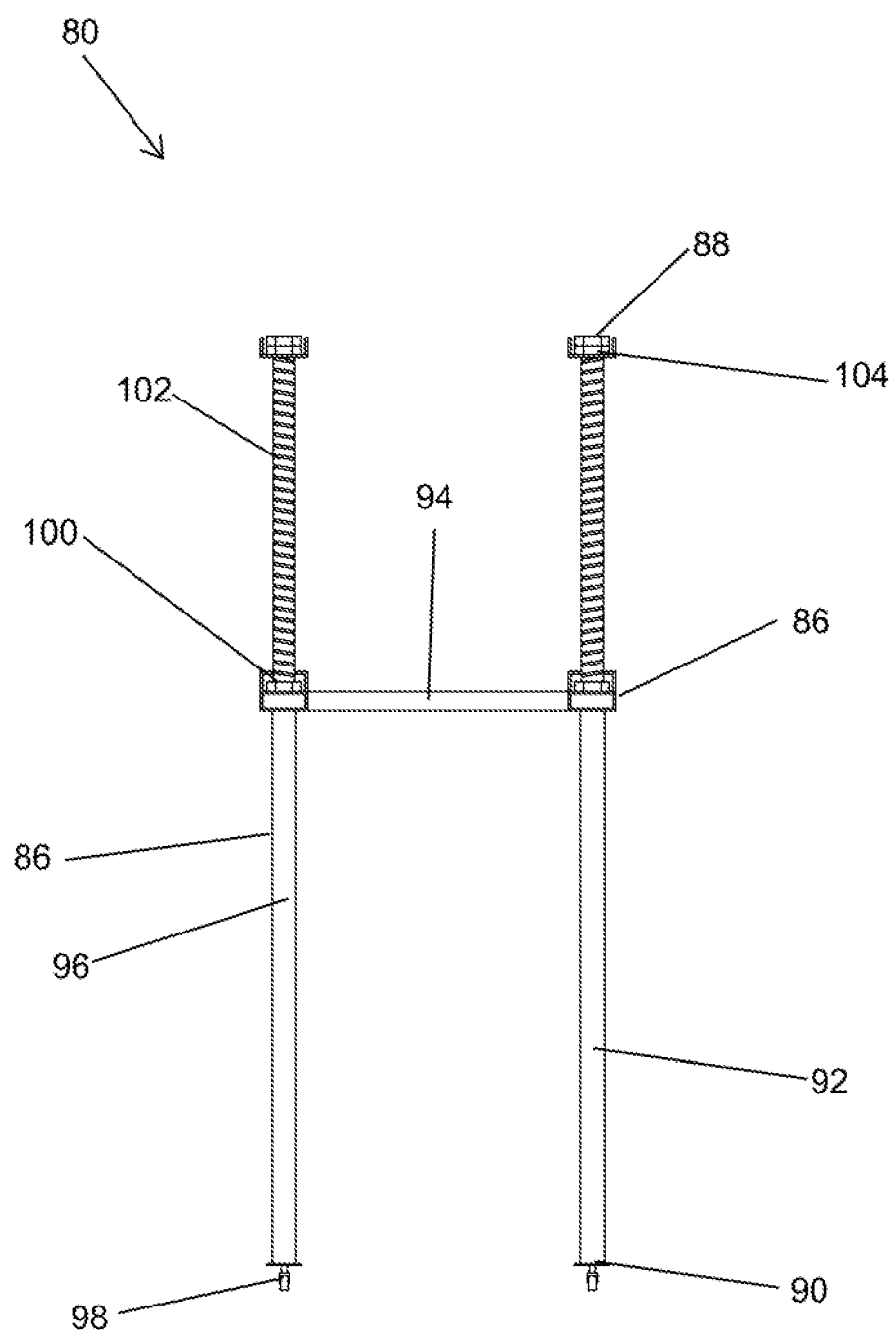
FIG. 6 is a side, elevation view of an agent injection system, an airbag apparatus, a process of filling a suspension airbag, a process of repairing a suspension airbag, and methods of use; the view showing an airbag jig system; the view showing a plurality of supports; the view showing a plurality of attachment features; the view showing a plurality of adjustment features; the view showing a plurality of features for holding the airbags in place; the view showing mobility features.
Figure 7:
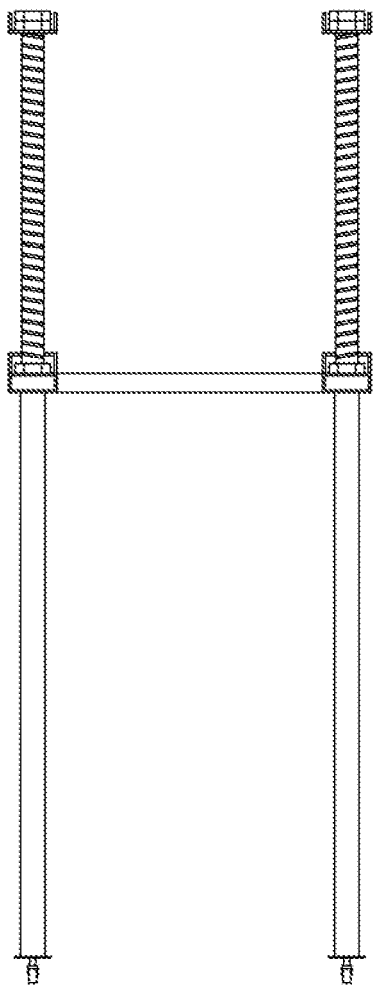
FIG. 7 is a side, elevation view of an agent injection system, an airbag apparatus, a process of filling a suspension airbag, a process of repairing a suspension airbag, and methods of use; the view showing an airbag jig system; the view showing a plurality of supports; the view showing a plurality of attachment features; the view showing a plurality of adjustment features; the view showing a plurality of features for holding the airbags in place; the view showing mobility features.
Figure 8:
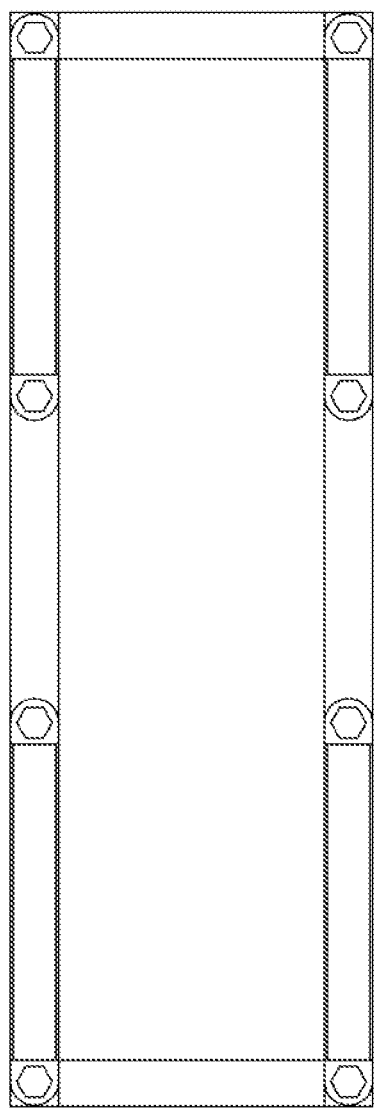
FIG. 8 is a top view of an agent injection system, an airbag apparatus, a process of filling a suspension airbag, a process of repairing a suspension airbag, and methods of use; the view showing an airbag jig system; the view showing a plurality of supports; the view showing a plurality of attachment features; the view showing a plurality of adjustment features; the view showing a plurality of features for holding the airbags in place; the view showing mobility features.
Figure 9:
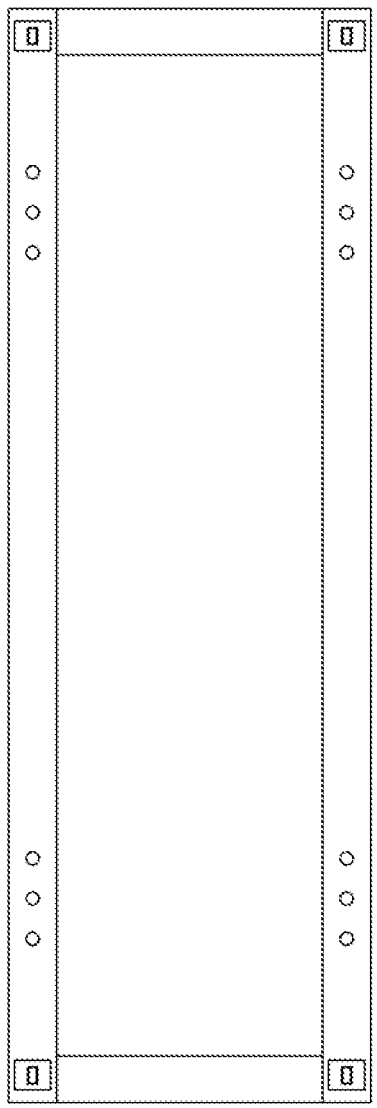
FIG. 9 is a bottom view of an agent injection system, an airbag apparatus, a process of filling a suspension airbag, a process of repairing a suspension airbag, and methods of use; the view showing an airbag jig system; the view showing a plurality of supports; the view showing a plurality of attachment features; the view showing a plurality of adjustment features; the view showing a plurality of features for holding the airbags in place; the view showing mobility features.
Figure 10:
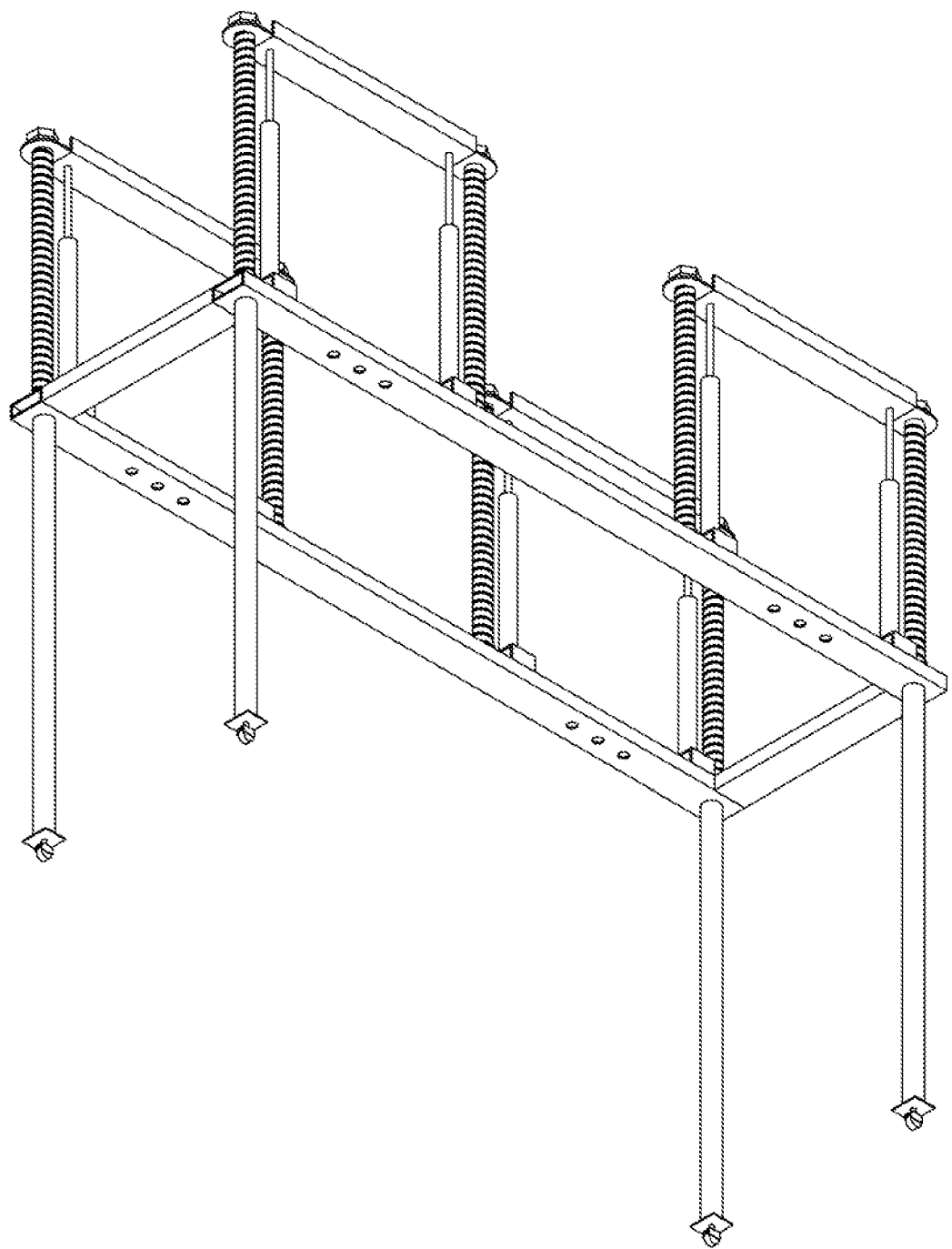
FIG. 10 is a bottom, perspective view of an agent injection system, an airbag apparatus, a process of filling a suspension airbag, a process of repairing a suspension airbag, and methods of use; the view showing an airbag jig system; the view showing a plurality of supports; the view showing a plurality of attachment features; the view showing a plurality of adjustment features; the view showing a plurality of features for holding the airbags in place; the view showing mobility features.
Figure 11:
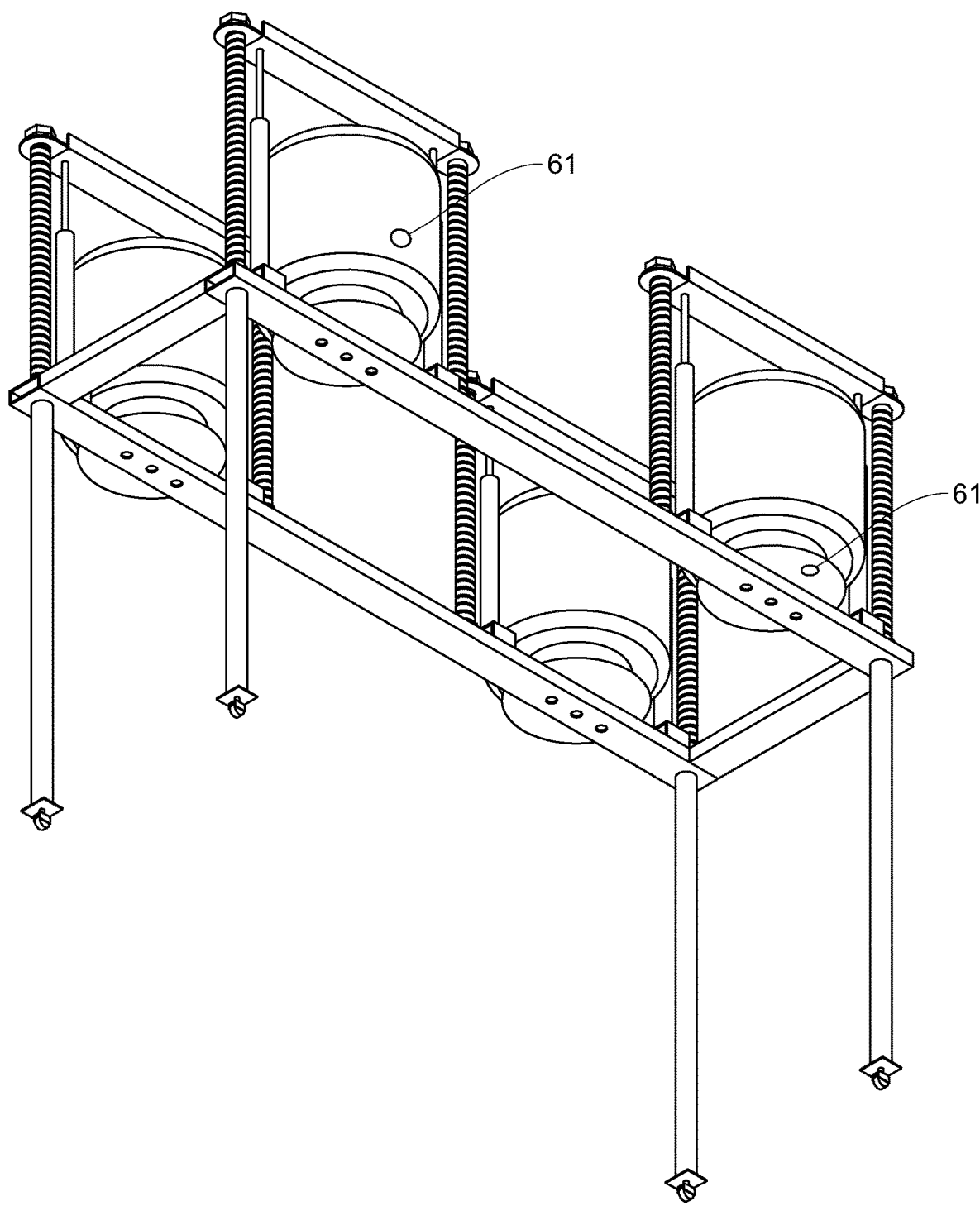
FIG. 11 is a bottom, perspective view of an agent injection system, an airbag apparatus, a process of filling a suspension airbag, a process of repairing a suspension airbag, and methods of use; the view showing an airbag jig system; the view showing a plurality of supports; the view showing a plurality of attachment features; the view showing a plurality of adjustment features; the view showing a plurality of features for holding the airbags in place; the view showing mobility features; the view showing a plurality of airbags located in the airbag jig system and ready for filling and/or filled.
Figure 12:
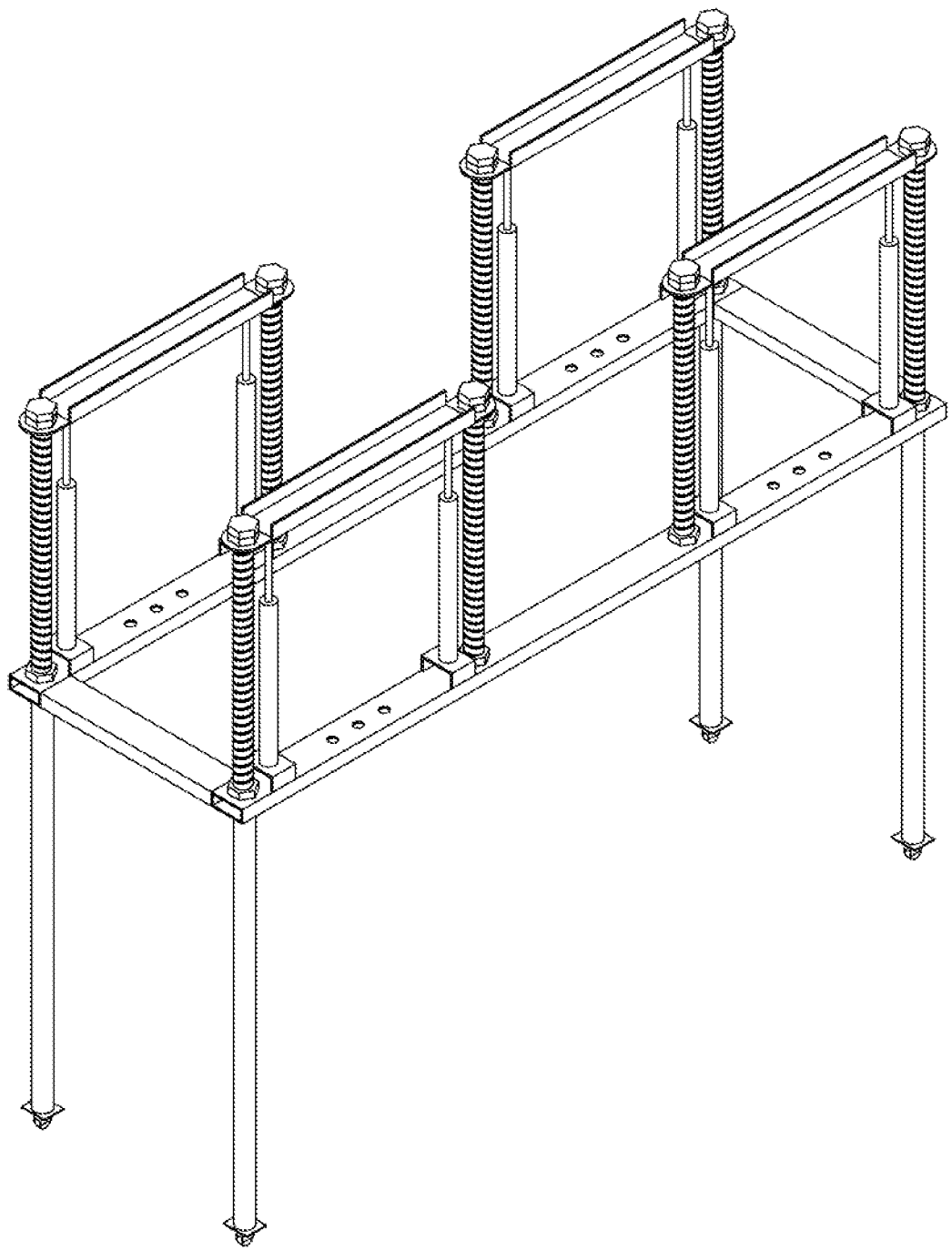
FIG. 12 is a top, perspective view of an agent injection system, an airbag apparatus, a process of filling a suspension airbag, a process of repairing a suspension airbag, and methods of use; the view showing an airbag jig system; the view showing a plurality of supports; the view showing a plurality of attachment features; the view showing a plurality of adjustment features; the view showing a plurality of features for holding the airbags in place; the view showing mobility features.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the disclosure.

Reference throughout this specification to "one embodiment," "an embodiment," "one example," or "an example" means that a particular feature, structure, or characteristic described in connection with the embodiment or example is included in at least one embodiment of the present disclosure. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

All illustrations of the drawings are for the purpose of describing selected versions of the present disclosure and are not intended to limit the scope of the present disclosure.

Although the disclosure has been explained in relation to its preferred embodiment, it is to be understood that many other possible modifications and variations can be made without departing from the spirit and scope of the disclosure.

System:

With reference to the figures, a moveable subframe system, a slider box improvement system, an agent injection system, an airbag apparatus, a process of filling a suspension airbag, a process of repairing a suspension airbag, and methods of use 10 are presented (also known as "airbag system", or "airbag replacement system", or "airbag suspension system", or "airbag suspension replacement system", or "airbag processing", or "airbag manufacturing system", or simply "system"). Airbag replacement system 10 is formed of any suitable size, shape and design and is configured to provide the state of the art with a safer, easier to repair and replace airbag for an airbag suspension system.

System 10, in the arrangement shown, as one example, is configured as an apparatus, process, manufacturing method, and methods of use for an airbag and/or airbag replacement for an air ride suspension system. More specifically, and without limitation, system 10 relates to an airbag and/or non-flat airbag suspension replacement device for an airbag suspension system related to tractors and/or trailers and/or other vehicles.

In the arrangement shown, as one example, system 10 is configured as an apparatus. The apparatus disclosed as part of system 10 is a replacement and/or new installation no-flat airbag to be used in an air suspension system. (airbag apparatus to be described further herein).

In the arrangement shown, as one example, system 10 also includes an airbag repair apparatus, process, and method of repair and implementation. (This process, jig system, and method of repair to be further described herein). In this example, a broken and/or punctured airbag of an existing airbag suspension system is repaired utilizing the methods and/or processes herein.

Furthermore, in the arrangement shown, as one example, system 10 is shown with a slider box assembly. However, system 10 is configured to work with any type of suspension system. Other types of suspension systems include, but are not limited to, slider box systems, subframe systems, fixed suspension systems, and various other systems.

In the arrangement shown, as one example, system 10 may include an operator 12, may include a vehicle 14, may include a suspension system 16, and an air ride system 18. In the arrangement shown, as one example, system 10 includes an agent injection system 20, an air bleed device 50, a plurality of airbags 60, and an airbag jig system 80, among other components, features, and functionality.

Operator:

In the arrangement shown, as one example, system 10 may include at least one operator 12. Operator (also known as a "user") is typically a user engaging with the system 10. Similarly, the operator 12 may be a user creating the apparatus 10, engaging in repair of the apparatus 10, engaging in the process of installation and/or the process of repair 10, engaging in the process of manufacture, or engaging in a method of use.

Similarly, an operator 12 may be a plurality of operators engaging with system 10. As one example, one operator 12 may be engaging with an existing airbag, for the repair of an airbag (to be further discussed herein). Similarly, another operator 12 and/or user may be engaging with a repair jig system (further described herein) to repair a damaged and/or punctured airbag from an airbag suspension system.

In the arrangement shown, as one example, a user 12 is an individual or group of users engaging with the operation of the jig assembly—whether this is manually or through the operation of a mechanical device, an automated device, or even through a graphical user interface via a computer processing unit, tablet, smartphone, and the like—and the user is engaging system 10 so that system 10 is being moved in relation to the load and/or other applicable assemblies. These and other users and/or operators are hereby contemplated for use. Furthermore, an operator may be a driver of a vehicle and the like. In this way, the operator might be involved in the repair or may be assembling the system 10, and the like.

Vehicle:

In the arrangement shown, as one example, system 10 may include a vehicle 14. Vehicle 14 (also known as "trailer", or "truck", or "automotive", or "locomotive", or "load", or "tractor/trailer") is formed of any suitable size, shape, and design and is configured as the primary object for which the suspension system and airbag assembly (to be further discussed herein) is providing functionality with.

Said another way, the airbag assembly is a part (in most cases) of an overall suspension system which is structurally supporting a load from a vehicular type assembly. Commonly, and in one example shown and discussed, the load comes from a trailer assembly. This trailer assembly may often be carrying additional loads through cargo, equipment, and the like.

Suspension System:

In the arrangement shown, as one example, system 10, and particularly the tractor/trailer 14, includes a suspension system 16. Suspension system 16 is formed of any suitable size, shape, and design and is configured to aid in the operation of the vehicle 14 by providing suspension to the wheels and/or axles and other components. Suspension systems 16 are well known in the art. In one example, the present disclosure provides for an enhanced suspension system which is an improvement upon the state of the art and provides for the ability and functionality of some other features and components disclosed herein.

Air Ride System:

In the arrangement shown, as one example, system 10 and particularly the suspension system 16 includes an air ride system 18. Air ride system 18 (also referred to as "air ride suspension system") is formed of any suitable size, shape, and design and is configured to provide an air suspension system which provides for comfort for an operator 12 of the tractor/trailer 14. Furthermore, the air ride suspension system 18 is formed to provide improved safety for the load of a vehicle and/or cargo due to the absorption and/or shock and/or impact absorption features the airbag and/or air ride system 18 provides. In this way, the airbag and/or air ride suspension system 18 improves upon operation of a vehicle 14.

Agent Injection System:

In the arrangement shown, as one example, system 10 includes an agent injection system 20. Agent injection system 20 (also known as "foam injection system", or "agent supply system", or "foam supply system" or simply "agent system") is formed of any suitable size, shape, and design and is configured to provide a system for providing an agent and/or a mix of a plurality of agents in a safe and effective manner.

In the arrangement shown, as one example, agent injection system 20 is configured to provide a polyurethane liquid, to be pumped into airbags, and/or replace air within an airbag so that a non flat airbag is created. In this way, and said another way, the agent injection system 20 provides a system which injects the hollow interior of the airbag with a substance and/or agent such that air within the hollow interior is replaced by an agent or foam agent 63 which functions similarly to air when the air is within the hollow interior. In this way, the agent injection system 20 is configured to create non flat or no flat airbags.

In the arrangement shown, as one example, agent injection system 20 may include a first agent tank 22, a first agent 24, a second agent tank 26, a second agent 28, a first hose 30, a second hose 32, a fill hose or single hose 33, among other structural components, other components and features. Furthermore, although two tanks and two different agents are contemplated for use, only one agent may be needed. Additionally, a plurality of tanks and a plurality of various agents (at the same or different steps in the process) may be utilized and are hereby contemplated for use in accordance with the agent injection system 20.

In the arrangement shown, as one example, agent injection system 20 may also include a first hose 30, a second hose 32, a plurality of pressure gauges 34, other gauges 36, a mixing system 38—for mixing one or more agents—a pressure system or pump 40, an injector 42, and a sensor system 44, among other structural components, sensing and mixing components, other components, steps, and features.

Air Bleed System:

In the arrangement shown, as one example, system 10, includes an air bleed device 50. Air bleed device 50 may not be required, especially when applied to the process and manufacturing of new airbags which may not contain air within. Air bleed device 50 (also known as "air bleed system", or "bleed system") is formed of any suitable size, shape, and design and is configured to allow air within the hollow interior of the airbag to exit the airbag while the airbag is filled with an agent and/or plurality of agents. In this way, the air can be displaced safely and successfully while flowing through the air bleed device.

In the arrangement shown, as one example, air bleed device 50 is a standalone device which punctures the membrane of the airbag (membrane and airbag to be further discussed herein). In an alternative arrangement, the air bleed device 58 includes a first aperture for bleeding air 59 which may also be inserted into existing apertures 59, both foreseen or planned and unforeseen apertures). In the arrangement shown, as one example, air bleed device 50 may include a first end 52 and a second end 54 and have a hollow interior tube for which air can flow through from the interior of the air bag to the environment. Furthermore, in the arrangement shown, airbag bleed device 50 may also include a pressure gauge, a valve or plurality of valves, and a controller 58, among other structural components, other components and features.

In an alternative embodiment, the air bleed device 50 may also be incorporated into the airbag jig system 80 and/or the airbag itself. In this way, the airbag is always equipped with an air bleed system for ease in repair and the like.

Airbag:

In the arrangement shown, as one example, system 10 includes an airbag 60. Airbag 60 (also known as "air lift", or "air lift system", or "airbag device", or "airbag system", or "suspension airbag", or "suspension air lift", or "air spring", or simply "bag") is formed of any suitable size, shape, and design and is configured to provide air suspension for a tractor/trailer 14 for the purpose of providing a smooth, constant ride.

In the arrangement shown, as one example, air spring 60 extends a length from a first end 62 to a second end 64. In the arrangement shown, as one example, the airbag 60 is formed of a membrane 72 arranged in a desired shape (fairly rigid in most applications) which has a hollow interior 66 (commonly pressurized with air), has an interior surface 68 and an exterior surface 70, among other structural components, other components and features.

In the arrangement shown, as one example, the term "airbag" may refer to a new airbag which is being created with the processes and methods of use described herein. Furthermore, the term "airbag" may also refer to airbags which are in operation which are being modified in accordance with the processes and methods of use described herein. Furthermore, the term "airbag" may refer to an airbag which is in operation but has reached a state of needing repair and is then repaired in accordance with the processes and methods of use described herein. Furthermore, the term "airbag" may refer to an airbag which was previously removed and/or is a damaged airbag which was otherwise destined to be discarded. These and other airbags are airbags which might be created or repaired herein, and the like.

In the arrangement shown, as one example, airbag 60 for ease example is commonly used to refer to airbags in use with tractor/trailers. However, airbag 60 may be used in a variety of applications and vehicles including, but not limited to, buses, trucks, passenger cars, trains, heavy equipment, and the like. Furthermore, many common airbag applications include electrical management of the airbag. These and other airbag applications are hereby contemplated for use in accordance herein.

Airbag Jig Device:

In the arrangement shown, as one example, system 10 includes an airbag jig system 80. Airbag jig system 80 (also known as "airbag jig device", or "airbag frame", or "airbag jig", or "frame", or simply "jig") is formed of any suitable size, shape, and design and is configured to provide a jig for making and/or repairing airbags 60. In the arrangement shown, as one example, airbag jig device 80 is configured to support airbags, provide various measurements and adjustments for airbags in place on the jig, create airbags, repair airbags, and the like. In this way, the jib system 80 can be used to create, repair, and/or modify and measure various parameters associated with various airbags for various airbag applications.

In the arrangement shown, as one example, the airbag jig system extends a length from a first end 82 to a second end 84 between opposing sides 86 (opposing sides 86 being referred to as a front and a back). In the arrangement shown, as one example, the airbag jig system 80 also includes a bottom 90 and a top 88. In the arrangement shown, as one example, the airbag jig system 80 is capable of holding and/or supporting multiple airbags at once while providing an operator access to a plurality of airbags at any given time.

Furthermore, and in the arrangement shown, as one example, the airbag jig system 80 includes a plurality of supports 92 formed as beams 94 and lintels 96. Additionally, and in the arrangement shown, as one example, airbag jig system 80 includes a plurality of mobility features 98, a plurality of attachment features 100, airbag attachment features 102, and various adjustment features 104. Additionally, the airbag jig system 80 may include hose supports 106, agent tank supports 108, and various gauge and/or measurement features and/or attachment features 110, among other components, features, and functionality.

In an alternative embodiment, a modified airbag jig system 80 may be a smaller mobile system capable of fitting under vehicles such that the jig system can be brought to the location of the airbag, as opposed to the airbag being brought to the location of the jig. Furthermore, in the arrangement shown, as one example, one arrangement of supports made of steel channel is shown. However, other arrangements which support airbags and allow for airbag adjustments have also been tested and may have fewer supports or arrangements, and may support a varying number of airbags, and the like. Similarly, other materials are hereby contemplated for use.

Process of Creating an Airbag:

In one example, an airbag jig system 80 can be used to create a new airbag 60. In this arrangement, an empty airbag is secured to the jig system 80. Once the airbag is secured to the jig system 80, an injector 42 is inserted to the airbag 60 via a first aperture for filling the airbag 61, and an agent or foam material 63 is pumped into the hollow interior of the airbag at a desired air pressure level, inflating the airbag to a desired pressure.

In the arrangement shown, as one example, the agent and/or agents are delivered from a plurality of tanks either through gravity powered delivered and/or a pressure powered delivery system. In one arrangement, a plurality of agents from a plurality of tanks are mixed prior to delivery to the interior of the airbag. In another arrangement, the agents may be mixed within the airbag.

Once the airbag is inflated to a desired shape and/or pressure, the injector is removed and the hole covered with a lid and/or sealed and or the valve is left alone. Once the airbag is ready for use, the airbag is then removed from the jig system and can be put into application in a vehicle.

Process of Repairing an Airbag:

In one example, an airbag jig system 80 can be used to repair an airbag 60. In this arrangement. An airbag is removed from application and/or from a vehicle. The airbag may be damaged or undamaged. Similarly, the airbag may be operable or inoperable, depending on the circumstances. Once the airbag is removed from the vehicle, the airbag can be placed on the airbag jig system 80.

In one example, an air bleed device may need to be placed in the top or into the airbag to allow for air to bleed out while an agent is injected into the airbag. Once the agent reaches a desired level the bleed device can be removed and the hole repaired or the valve left alone. Once the bleed device is removed, more agents may be pumped into the hollow interior of the airbag to further reach a desired pressure level.

Once the airbag is inflated to a desired shape and/or pressure, the injector is removed and the hole covered with a lid and/or sealed and or the valve is left alone. Once the airbag is ready for use, the airbag is then removed from the jig system and can be put into application in a vehicle.

In another arrangement, an airbag may be damaged or need a hole patched prior to agent being added to the hollow interior. In another arrangement, the hole and/or damage and/or aperture may be small enough that the agent causes the aperture to become repaired when the airbag is being filled. Once the airbag is repaired and once the airbag is inflated to a desired shape and/or pressure, the injector is removed and the hole covered with a lid and/or sealed and or the valve is left alone. Once the airbag is ready for use, the airbag is then removed from the jig system and can be put into application in a vehicle.

In Operation/Methods of Use:

In the arrangement shown, as one example, a user 12 can easily and efficiently employ the systems disclosed herein in various methods and uses to safely, easily, and efficiently operate an airbag, create a new airbag, repair a damaged airbag, change an existing airbag, and the like. These systems and the various uses are hereby contemplated for use. The disclosure herein also considered methods of using these systems and features.

It will be appreciated by those skilled in the art that other various modifications could be made to the systems without parting from the spirit and scope of this disclosure. All such modifications and changes fall within the scope of the claims and are intended to be covered thereby.

What is claimed:

1. An improved airbag apparatus, comprising:
   an airbag;
   the airbag extending a length from a first end to a second end;
   the airbag having a membrane;
   the airbag having a hollow interior;
   the airbag having a first aperture for filling the airbag;
   the airbag having a first aperture for bleeding air from the airbag while the airbag is being filled;
   wherein the airbag is configured to act as a suspension airbag;
   wherein the airbag can be deflated;
   wherein the airbag is filled with a foam material;
   wherein the airbag is configured to accommodate repeated compression relative to the first end and the second end of the airbag;
   wherein the airbag is a replacement airbag;
   wherein the airbag has been drained of air and filled with the foam material;
   the foam material being a material capable of flexion in accordance with deformations caused on the airbag during operation.

2. The improved airbag apparatus of claim 1, further comprising:
   wherein the airbag is configured to provide smooth operation of a vehicle due to absorption of impacts.

3. An airbag jig system, comprising:
   a jig;
   the jig extending a length from a first end to a second end;
   the jig having opposing sides and a top and a bottom;
   the jig having a support system with a plurality of supports;
   the jig having a plurality of mobility features;
   the jig having a plurality of attachment features;
   the jig having an airbag attachment system;
   wherein the airbag attachment system can raise and lower a top support so as to accept airbags of varying dimensions therein;
   wherein the airbag attachment system can attach to airbags in order to support the airbag securely;
   an airbag;
   the airbag extending a length from a first end to a second end;
   the airbag having a membrane;
   the airbag having a hollow interior;
   the airbag having a first aperture for filling the airbag;
   the airbag having a first aperture for bleeding air from the airbag while the airbag is being filled;
   wherein the airbag is configured to act as a suspension airbag;
   wherein the airbag can be deflated;
   wherein the airbag is filled with a foam material;
   wherein the airbag is configured to accommodate repeated compression relative to the first end and the second end of the airbag;
   an air bleed device;
   wherein the air bleed device is configured to allow a predetermined amount of air to release from the airbag while a predetermined amount of agent is injected into the airbag;
   a foam injection system;
   the foam injection system having an injector;
   wherein the foam injection system is configured to provide a foam mixture from a tank and deliver the foam mixture into the hollow interior of the airbag;
   a pressure system;
   at least one foam agent;
   a plurality of agent tanks.

4. The system of claim 3, further comprising:
   the jig having a plurality of hoses;
   the jig having a plurality of hose supports;
   wherein the plurality of hoses connect to the plurality of agent tanks;

wherein the hoses can be mixed into a single hose;
wherein a single hose is configured to fill the airbag;
the jig having a plurality of agent tank supports.

5. The system of claim 3, further comprising:
the foam injection system having a first agent tank;
the first agent tank having the first agent;
the foam injection system having a first agent hose;
the foam injection system having a second agent tank;
the second agent tank having the second agent;
the foam injection system having a second agent hose;
the foam injection system having a mixing system;
wherein the mixing system causes the first agent and the second agent to mix after each of the agents exits the respective agent tank and is induced to inject into the airbag.

6. The system of claim 3, further comprising:
wherein the pressure system is formed of a pump.

7. The system of claim 3, further comprising:
wherein the pressure system is formed of gravitational force.

8. A method of loading an airbag, comprising the steps:
providing an airbag;
providing a jig;
providing a plurality of agents;
placing the airbag onto the jig;
securing the airbag;
inserting a bleed device into the airbag;
inserting an injector into the airbag;
forcing a foam agent into the airbag at a predetermined amount;
releasing air from the airbag to a predetermined amount;
pressurizing the airbag with the foam agent;
removing the injector;
removing the bleed device;
sealing the airbag from leakage;
utilizing the airbag for repeated deformations from pressure on the airbag.

9. The method of claim 8, further comprising:
providing a foam injection system with a first agent tank and a second agent tank; the first agent tank having a first agent; the foam injection system having a first agent hose; the second agent tank having a second agent; the foam injection system having a second agent hose; the foam injection system having a mixing system;
mixing the first agent and the second agent prior to pressurizing the airbag with a mixed foam agent;
wherein the airbag being pressurized is a damaged airbag being repaired.

10. An improved airbag apparatus, comparing:
an airbag;
the airbag extending a length from a first end to a second end;
the airbag having a membrane;
the airbag having a hollow interior;
the airbag having a first aperture for filling the airbag;
the airbag having a first aperture for bleeding air from the airbag while the airbag is being filled;
wherein the airbag is configured to act as a suspension airbag;
wherein the airbag can be deflated;
wherein the airbag is filled with an agent;
wherein the airbag is configured to accommodate repeated compression relative to the first end and the second end of the airbag;
wherein the airbag is a damaged airbag;
wherein the damaged airbag has been caused to leak air which filled the hollow interior;
wherein the damaged airbag leaks air due to a failure such as a puncture or failed seal;
wherein the airbag has been drained of air and filled with the agent;
the agent being a material capable of flexion in accordance with deformations caused on the airbag during operation.

\* \* \* \* \*